(12) United States Patent  
Matsumoto et al.

(10) Patent No.: US 7,184,051 B1  
(45) Date of Patent: Feb. 27, 2007

(54) METHOD OF AND APPARATUS FOR RENDERING AN IMAGE SIMULATING FLUID MOTION, WITH RECORDING MEDIUM AND PROGRAM THEREFOR

(75) Inventors: Shinya Matsumoto, Tokyo (JP); Takuya Seki, Tokyo (JP); Yuta Kiumra, Tokyo (JP); Yasuhiro Shimura, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 127 days.

(21) Appl. No.: 09/658,594

(22) Filed: Sep. 8, 2000

(30) Foreign Application Priority Data

Sep. 10, 1999 (JP) ................................. 11-257933

(51) Int. Cl.  
*G09G 5/34* (2006.01)

(52) U.S. Cl. ..................................... 345/581

(58) Field of Classification Search ................ 345/582, 345/581, 583–588, 589, 419  
See application file for complete search history.

(56) References Cited

U.S. PATENT DOCUMENTS

| | | | |
|---|---|---|---|
| 4,677,576 A * | 6/1987 | Berlin et al. ................. | 345/420 |
| 5,194,969 A * | 3/1993 | DiFrancesco ................ | 358/463 |
| 5,325,480 A * | 6/1994 | Rice ............................ | 345/474 |
| 5,327,509 A * | 7/1994 | Rich ........................... | 382/108 |
| 5,412,765 A * | 5/1995 | Yamrom et al. .............. | 345/587 |
| 5,490,239 A * | 2/1996 | Myers ......................... | 345/581 |
| 5,680,531 A | 10/1997 | Litwinowicz et al. | |
| 5,696,892 A * | 12/1997 | Redmann et al. ............ | 345/582 |
| 5,751,289 A * | 5/1998 | Myers ......................... | 345/419 |
| 5,757,376 A * | 5/1998 | Suzuoki et al. .............. | 345/581 |
| 5,774,125 A | 6/1998 | Suzuoki et al. | |
| 5,809,219 A * | 9/1998 | Pearce et al. ................ | 345/426 |
| 5,870,098 A * | 2/1999 | Gardiner ...................... | 345/426 |
| 5,920,492 A * | 7/1999 | Montag et al. ................ | 703/6 |
| 5,929,869 A * | 7/1999 | Wilde .......................... | 345/543 |
| 5,988,862 A * | 11/1999 | Kacyra et al. ................ | 703/6 |
| 6,030,289 A * | 2/2000 | Nomi et al. .................. | 463/32 |
| 6,037,948 A * | 3/2000 | Liepa .......................... | 345/582 |
| 6,064,393 A * | 5/2000 | Lengyel et al. ............. | 345/427 |
| 6,097,402 A * | 8/2000 | Case et al. ................... | 345/543 |
| 6,184,891 B1 * | 2/2001 | Blinn .......................... | 345/426 |

(Continued)

FOREIGN PATENT DOCUMENTS

EP 0 583 061 7/1993

(Continued)

OTHER PUBLICATIONS

Max et al., "Flow visualization using moving textures" ICASE/LARC Symposium on Visualizing Time-varying Data. Proceedings (NASA Conf. Publ. 3321), Proceedings of 1995. ICASE/LARC Symposium on on Visualizing Time-Varying Data, Williamsburg, VA, USA, Sep. 18-19, 1995, pp. 77-87, XP008014790 1996, Hampton, VA, USA, NASA, USA.

(Continued)

*Primary Examiner*—Kee M. Tung  
*Assistant Examiner*—J. Amini  
(74) *Attorney, Agent, or Firm*—Paul A. Guss

(57) ABSTRACT

An apparatus for processing an image has a texture rendering unit for storing a texture image in a texture rendering area of an image memory, an image rendering unit for storing a polygon in a display rendering area of the image memory based on at least the texture image, and mapping the texture image onto the polygon, a texture moving unit for moving the texture image stored in the texture rendering area in an arbitrary direction and restoring the moved texture image in the texture rendering area, and a texture mapping unit for mapping the moved texture image onto the polygon stored in the display rendering area.

10 Claims, 18 Drawing Sheets

U.S. PATENT DOCUMENTS

| | | | |
|---|---|---|---|
| 6,226,000 B1 * | 5/2001 | Richens et al. | 345/419 |
| 6,266,071 B1 * | 7/2001 | Stam et al. | 345/473 |
| 6,326,964 B1 * | 12/2001 | Snyder et al. | 345/419 |
| 6,420,698 B1 * | 7/2002 | Dimsdale | 250/234 |
| 6,448,971 B1 * | 9/2002 | Seefeldt et al. | 345/475 |
| 6,500,008 B1 * | 12/2002 | Ebersole et al. | 434/226 |
| 6,525,765 B1 * | 2/2003 | Brett et al. | 348/97 |
| 6,556,775 B1 * | 4/2003 | Shimada | 386/121 |
| 6,828,985 B1 * | 12/2004 | Long et al. | 345/620 |

FOREIGN PATENT DOCUMENTS

| | | |
|---|---|---|
| GB | 2 324 013 | 10/1998 |
| JP | 3-156574 | 7/1991 |
| JP | 10-198819 | 7/1998 |
| JP | 10-283500 | 10/1998 |

OTHER PUBLICATIONS

King et al., "Fast animation of amorphous and gaseous phenomena" International Workshop on Volume Graphics. Preprint, Proceedings of VG99: International Workshop on Volume Graphics, Swansea, UK, Mar. 24-25, 1999, pp. 333-345 vol. 2, XP002234807 1999, Swansea, UK, Univ. Wales Swansea, UK.

* cited by examiner

FIG. 9

OBJECT INFORMATION TABLE (322)

| | |
|---|---|
| RECORD 0 | ·NUMBER OF POLYGONS<br>·ADDRESS OF TEXTURE INFORMATION TABLE<br>·ADDRESS OF POLYGON INFORMATION TABLE<br>·ADDRESS OF MOVEMENT INFORMATION TABLE<br>ETC. |
| RECORD 1 | ·NUMBER OF POLYGONS<br>·ADDRESS OF TEXTURE INFORMATION TABLE<br>·ADDRESS OF POLYGON INFORMATION TABLE<br>·ADDRESS OF MOVEMENT INFORMATION TABLE<br>ETC. |
| | ⋮ |

FIG. 11

POLYGON INFORMATION TABLE (308)

| | |
|---|---|
| RECORD 0 | ·VERTEX COORDINATES OF POLYGON<br>·RENDERING RANGE (COORDINATES) FOR TEXTURE IMAGE TO BE USED<br>ETC. |
| RECORD 1 | ·VERTEX COORDINATES OF POLYGON<br>·RENDERING RANGE (COORDINATES) FOR TEXTURE IMAGE TO BE USED<br>ETC. |
| | ⋮ |

FIG. 12

MOVEMENT INFORMATION TABLE (312)

| | |
|---|---|
| RECORD 0 | ·RENDERING RANGE (COORDINATES) FOR TEXTURE IMAGE TO BE MOVED<br>·MOVEMENT DIRECTION<br>·CIRCULATION INFORMATION<br>  ETC. |
| RECORD 1 | ·RENDERING RANGE (COORDINATES) FOR TEXTURE IMAGE TO BE MOVED<br>·MOVEMENT DIRECTION<br>·CIRCULATION INFORMATION<br>  ETC. |
| | ⋮ |

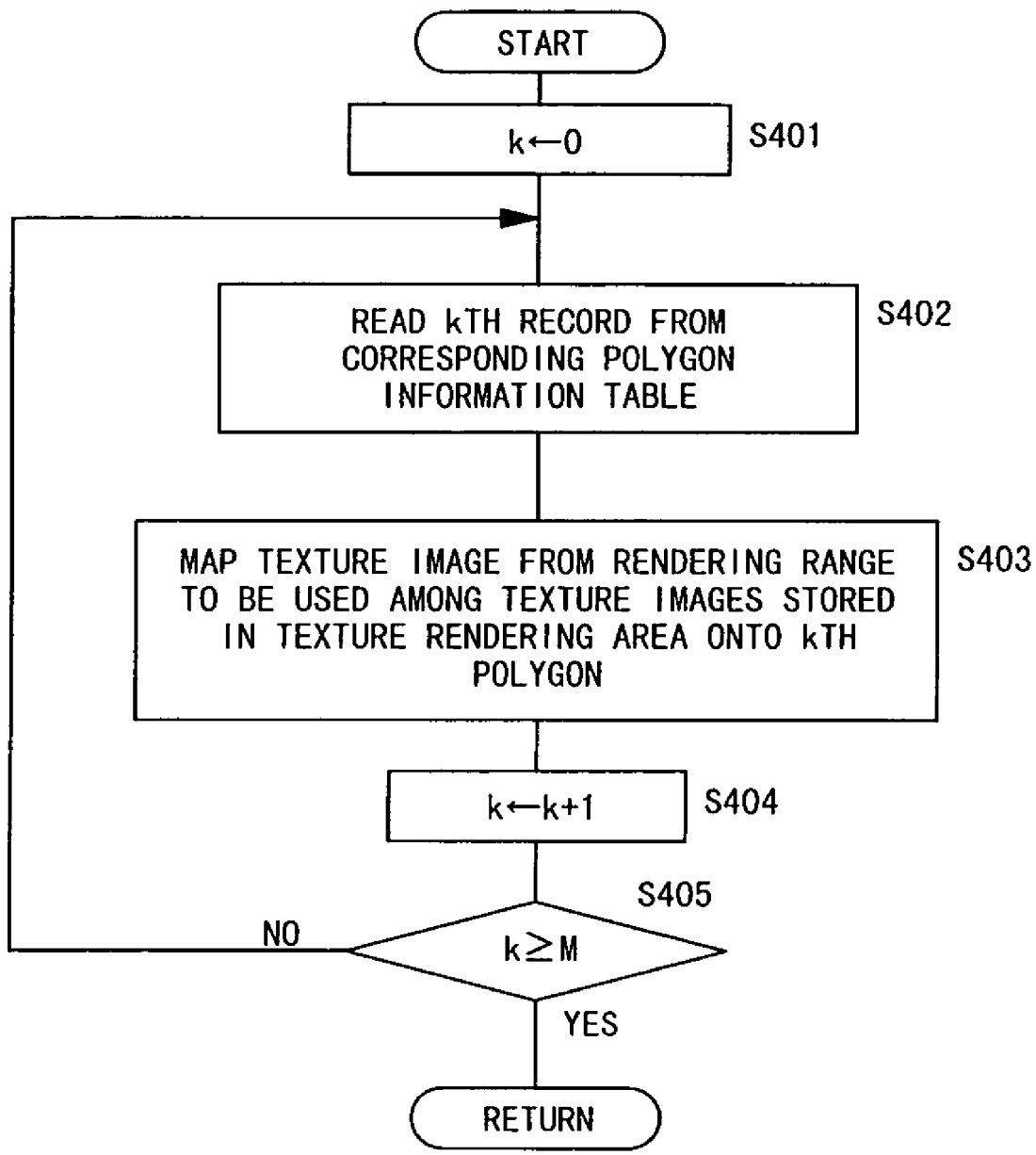

METHOD OF AND APPARATUS FOR RENDERING AN IMAGE SIMULATING FLUID MOTION, WITH RECORDING MEDIUM AND PROGRAM THEREFOR

BACKGROUND OF THE INVENTION

1. Field of the Invention

The present invention relates to a method of and an apparatus for rendering an image representing a fluid motion such as a stream of water or a flow of smoke, a recording medium which stores a program and data for carrying out such an image rendering process, and a program for carrying out such an image rendering process.

2. Description of the Related Art

Recently, various computer graphics (CG) processing techniques including hidden line processing, hidden surface removal, smooth shading, texture mapping, etc. have been in rapid progress in combination with quickly growing hardware technologies.

According to a general CG processing scheme, a plurality of three-dimensional shapes (objects) are generated by three-dimensional modeling of CAD, and a rendering process is performed by applying colors and shades to the objects, adding optical properties including mirror reflection, diffuse reflection, refraction, transparency, etc. to the objects, adding surface patterns to the objects, and plotting images depending on surroundings such as window and scenery reflections and ambient light.

For rendering a fluid motion such as a stream of water or a flow of smoke, for example, it has been attempted to move a number of objects at random and thereafter map an image of water or smoke onto the objects.

Specifically, for processing ordinary polygons, a geometry operation unit performs perspective projection on the vertexes of polygons, and a rendering processor stores the obtained polygons in a display rendering memory.

For example, if a fluid motion is to be rendered by moving n objects at random and then mapping a texture onto the objects, then it is necessary to perform the above process, i.e., the ordinary polygon processing sequence with respect to an object, n times, and, as a result, it is necessary to perform (n×the number of polygon vertexes) perspective projection processes, and also to perform (n×the number of polygons) rendering processes.

In order to render a stream of water or a flow of smoke realistically, therefore, a number of objects need to be prepared, and the period of time required to compute and render those objects increases in proportion to the number of objects involved. Consequently, those objects are displayed on a display monitor at a reduced speed.

SUMMARY OF THE INVENTION

It is therefore an object of the present invention to provide a method of and an apparatus for rendering an image by moving a texture simulatively on at least one object thereby to greatly reduce the period of time required to calculate and render a fluid motion and also to render a high-quality image, a recording medium which stores a program and data for carrying out such an image rendering process, and a program for carrying out such an image rendering process.

According to the present invention, a texture is moved simulatively on at least one object thereby to render an image.

Specifically, one or more semitransparent textures are placed on the surface of at least one semitransparent or transparent object, and the one or more semitransparent textures are moved simulatively in an arbitrary direction, thereby rendering an image. The semitransparent or transparent object may be arranged in one or multiple layers.

Texture images that are moved simulatively on the surface of the object are superposed on the object, thereby generating or animating an infinite number of random patterns to express a fluid motion such as a stream of water or a flow of smoke.

Alternatively, one or more semitransparent textures may be placed on the surface of a plurality of semitransparent or transparent polygons which make up the object, and the one or more semitransparent textures may be moved simulatively in an arbitrary direction, thereby rendering an image. The semitransparent or transparent polygons may be arranged in one or multiple layers.

Texture images that are moved simulatively on the surface of the polygons are superposed on the polygons, thereby generating or animating an infinite number of random patterns to express a fluid motion such as a stream of water or a flow of smoke.

Since an image is rendered by moving a texture simulatively on at least one object, the period of time required to calculate and render a fluid motion can greatly be reduced, and a high-quality image can be rendered.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9 is a diagram showing details of an object information table;

FIG. 11 is a diagram showing details of a polygon information table;

FIG. 12 is a diagram showing details of a movement information table;

FIG. 18 is a flowchart of a processing sequence of a texture mapping means.

DESCRIPTION OF THE PREFERRED EMBODIMENT

An embodiment in which a method of and an apparatus for rendering an image according to the present invention are applied to an entertainment apparatus for performing three-dimensional CG processing, and a recording medium and a program according to the present invention are applied to a recording medium storing a program and data executed by the entertainment apparatus and such a program, will be described below with reference to FIGS. 1 through 18.

Figure 1:
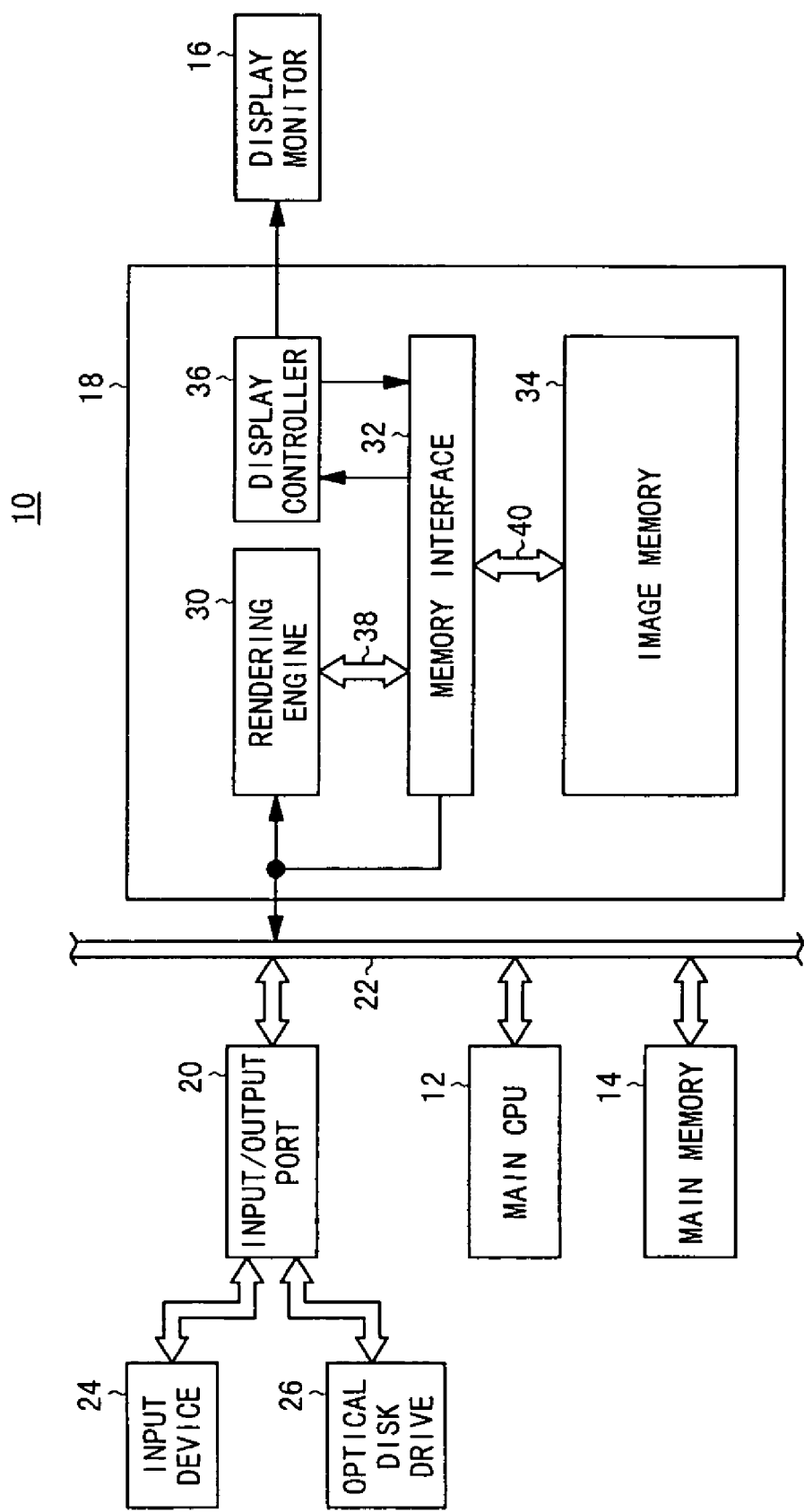
FIG. 1 is a block diagram of an entertainment apparatus according to an embodiment of the present invention.

As shown in FIG. 1, an entertainment apparatus 10 comprises a main CPU 12 for controlling the entertainment apparatus 10, a main memory 14 for storing various programs to be run and various data, an image processor 18 for generating image data under the control of the main CPU 12 and outputting the generated image data to a display monitor 16, e.g., a CRT, and an input/output port 20 for sending data to and receiving data from external devices.

The main memory 14, the image processor 18, and the input/output port 20 are connected to the main CPU 12 via a bus 22. To the input/output port 20, there are connected an input device 24 for inputting data (key entry data, coordinate data, etc.) to the entertainment apparatus 10, and an optical disk drive 26 for playing back an optical disk such as a CD-ROM or the like in which various programs and data (object-related data, texture data, etc.) are stored.

The image processor 18 comprises a rendering engine 30, a memory interface 32, an image memory 34, and a display controller 36 such as a programmable CRT controller or the like.

The rendering engine 30 serves to render image and store image data in the image memory 34 via the memory interface 32 based on a rendering command supplied from the main CPU 12.

A first bus 38 is connected between the memory interface 32 and the rendering engine 30, and a second bus 40 is connected between the memory interface 32 and the image memory 34. Each of the first and second buses 38, 40 has a 128-bit width, for example, for allowing the rendering engine 30 to render and store image data in the image memory 34 at a high speed.

The rendering engine 30 is capable of rendering image data of 320×240 pixels or image data of 640×480 pixels according to the NTSC or PAL system on a real-time fashion, i.e., more than ten times to several ten times in 1/60 seconds to 1/30 seconds.

Figure 8:
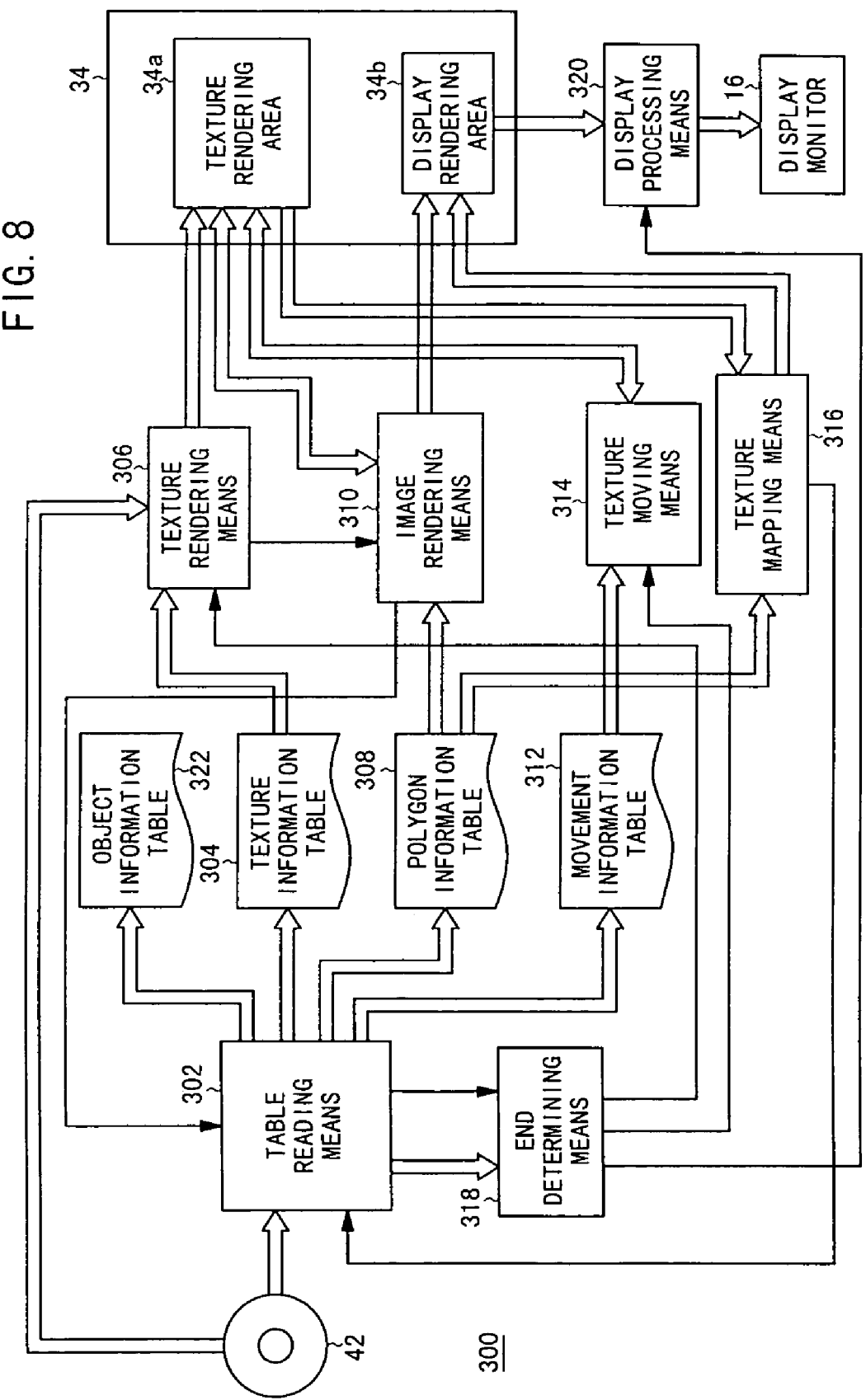
FIG. 8 is a functional block diagram of a rendering means according to the embodiment of the present invention.

The image memory 34 is of a unified memory structure that is able to designate a texture rendering area 34a and a display rendering area 34b as the same area (see FIG. 8).

The image controller 36 writes texture data read from the optical disk via the optical disk drive 26 or texture data generated in the main memory 14 via the memory interface 32 into the texture rendering area 34a of the image memory 34, and reads image data stored in the display rendering area 34b of the image memory 34 via the memory interface 32 and outputs the read image data to the display monitor 16 to display an image on its display screen.

A characteristic function of the entertainment apparatus 10 will be described below with reference to FIGS. 2 through 18.

According to the characteristic function, an image is rendered by moving a texture simulatively on at least one object.

Figure 2:
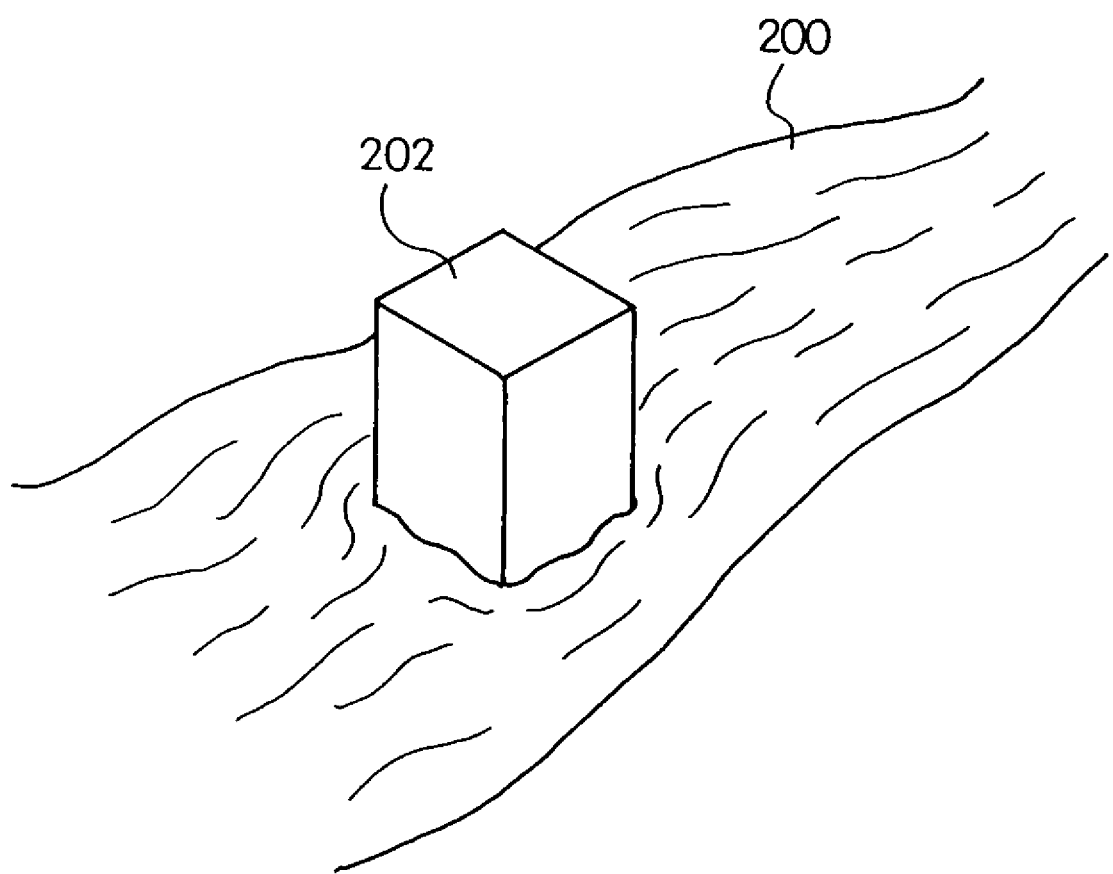
FIG. 2 is a perspective view showing the manner in which the water of a river hits a post and flows in divided streams on both sides of the post.

Specifically, as shown in FIG. 2, it is assumed that the water of a river 200 hits a post 202 standing in the river 200 and flows in divided streams on both sides of the post 202.

Figure 3:
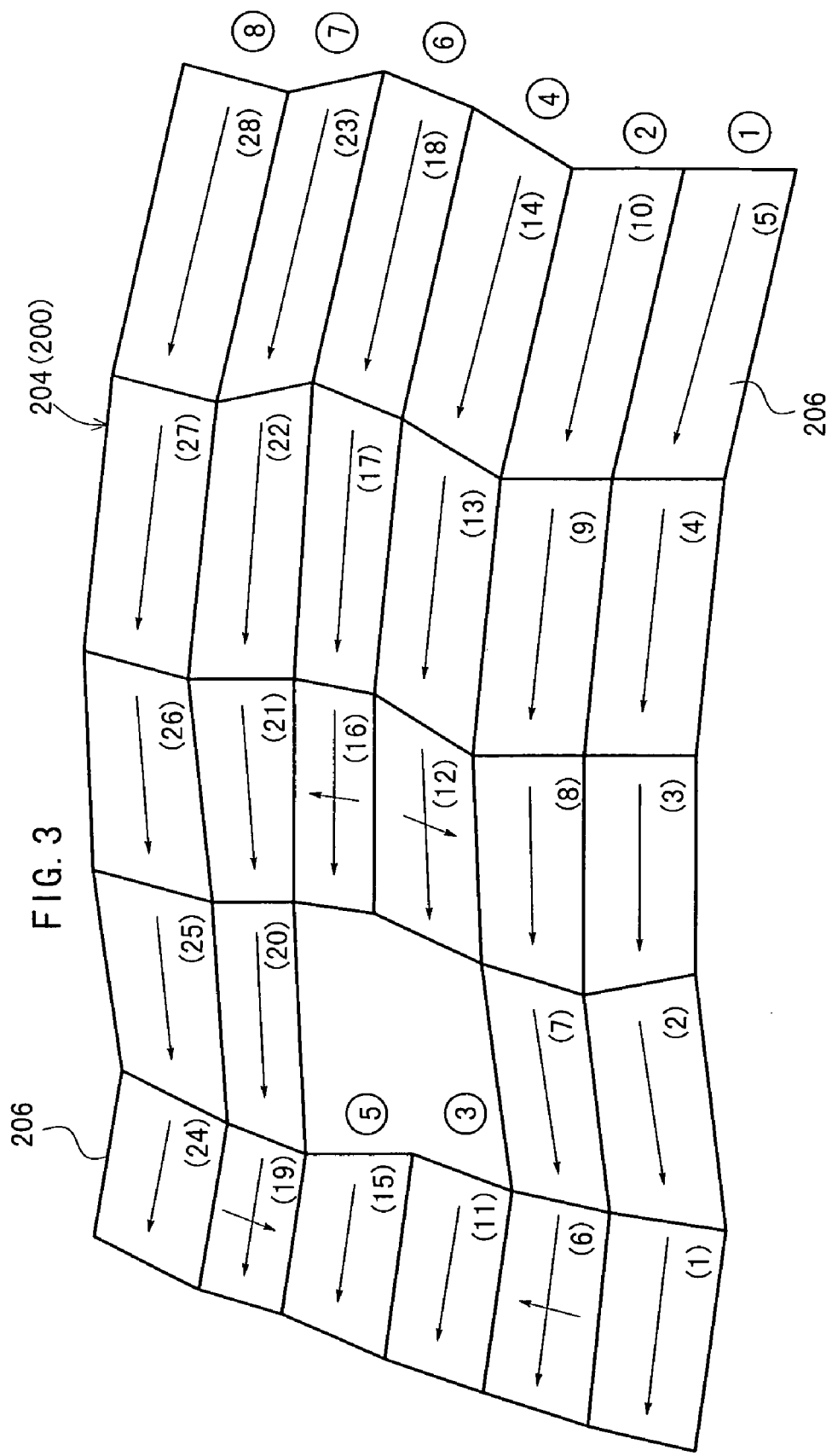
FIG. 3 is a diagram showing the object illustrated in FIG. 2 as it is divided into a number of polygons.
Figure 4A:
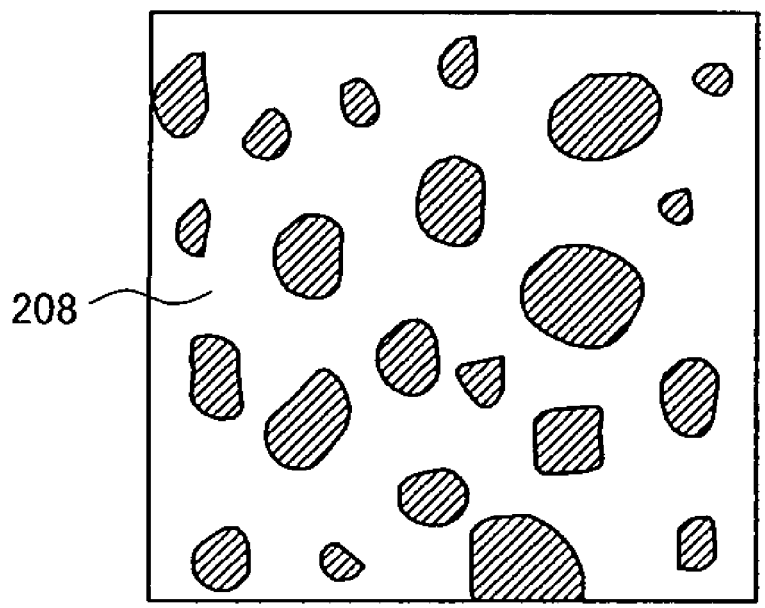
FIGS. 4A and 4B are views of texture images.
Figure 4B:
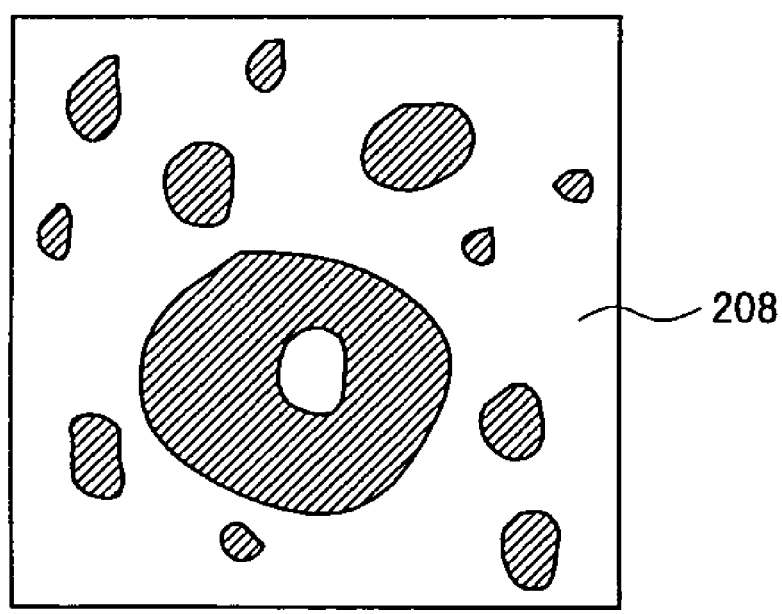

As shown in FIG. 3, an object 204 representing the river 200 except for the post 202 is constructed of a number of semitransparent or transparent polygons 206, and a semitransparent texture image 208 (see FIG. 4A, for example) is mapped onto each of the polygons 206. The semitransparent texture image 208 may be an image expressing diffused reflections of light from waves, such as images containing randomly scattered semitransparent spots, as shown in FIGS. 4A and 4B.

The texture image 208 to be used is stored in the texture rendering area 34a of the image memory 34. Thereafter, required polygons 206 are stored in the display rendering area 34b of the image memory 34 and the texture image 208 is mapped onto each of the polygons 206, after which the polygons 206 with the mapped texture image 208 are displayed.

Then, the texture image 208 in the texture rendering area 34a is moved a predetermined interval in an arbitrary direction and restored in the texture rendering area 34a, and the restored texture image 208 is mapped onto each of the polygons 206, after which the polygons 206 with the mapped texture image 208 are displayed.

For example, an arbitrary texture image 208 is stored in the texture rendering area 34a in a pattern corresponding to the shape of the object 204 that is made up of the polygons 206.

Figure 5:
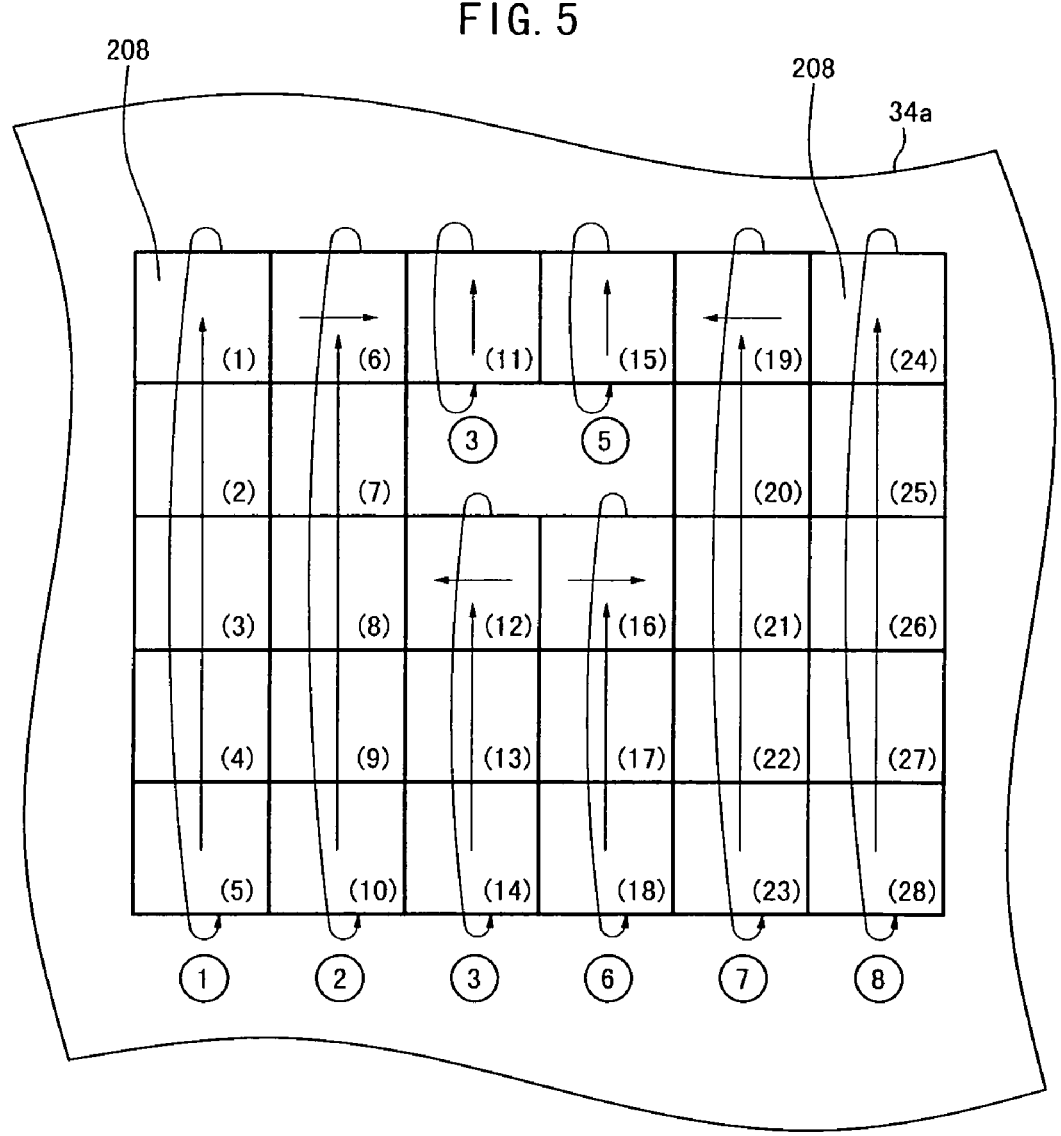
FIG. 5 is a diagram illustrative of the directions in which texture images stored in a texture rendering area move.

Specifically, texture images 208 covering five polygons 206 in a horizontal succession indicated by ① in FIG. 3 are stored in an area ① in the texture rendering area 34a as shown in FIG. 5, and texture images 208 covering five polygons 206 in a horizontal succession indicated by ② in FIG. 3 are stored in an area ② in the texture rendering area 34a as shown in FIG. 5.

Then, a texture image 208 corresponding to one polygon 206 indicated by ③ in FIG. 3 is stored in an area ③ in the texture rendering area 34a as shown in FIG. 5, and texture images 208 covering three polygons 206 in a horizontal succession indicated by ④ in FIG. 3 are stored in an area ④ in the texture rendering area 34a as shown in FIG. 5. Similarly, texture images 208 covering remaining polygons indicated by ⑤–⑧ in FIG. 3 are stored in corresponding areas in the texture rendering area 34a as shown in FIG. 5.

Then, a texture image 208 indicated by (1) in FIG. 5 is mapped onto a polygon 206 indicated by (1) in FIG. 3. Like-wise, other texture images 208 stored in the texture rendering area 34a are mapped onto corresponding polygons 206. When all the stored texture images 208 are mapped onto the corresponding polygons 206, an initial image is displayed.

Thereafter, as shown in FIG. 5, each of the texture images 208 is moved a predetermined interval in the direction indicated by the arrow, and restored in the texture rendering area 34a. Some texture images 208, e.g., those indicated by ①, ② in FIG. 5, are cycled to express an image in a circulating fashion. Specifically, when a succession of texture images 208 are moved a given interval, a texture image 208 is pushed out of the end of the succession, i.e., erased from the end of the texture rendering area 34a, and put back to the beginning of the succession, i.e., restored in the beginning of the texture rendering area 34a.

Each of the texture images 208 indicated by (6), (12), (16), (19) in FIG. 5 is moved in the two directions indicated by the arrows, and restored in the texture rendering area 34a.

In this manner, as shown in FIG. 2, it is possible to display a realistic image of the flowing water of the river 200, showing the water of the river 200 flowing in one direction and changing its direction around the post 202.

In the above example, the characteristic function of the present invention is applied to a single object 204. However, the characteristic function of the present invention is also applicable to a number of objects arranged in superposed layers.

Figure 6:
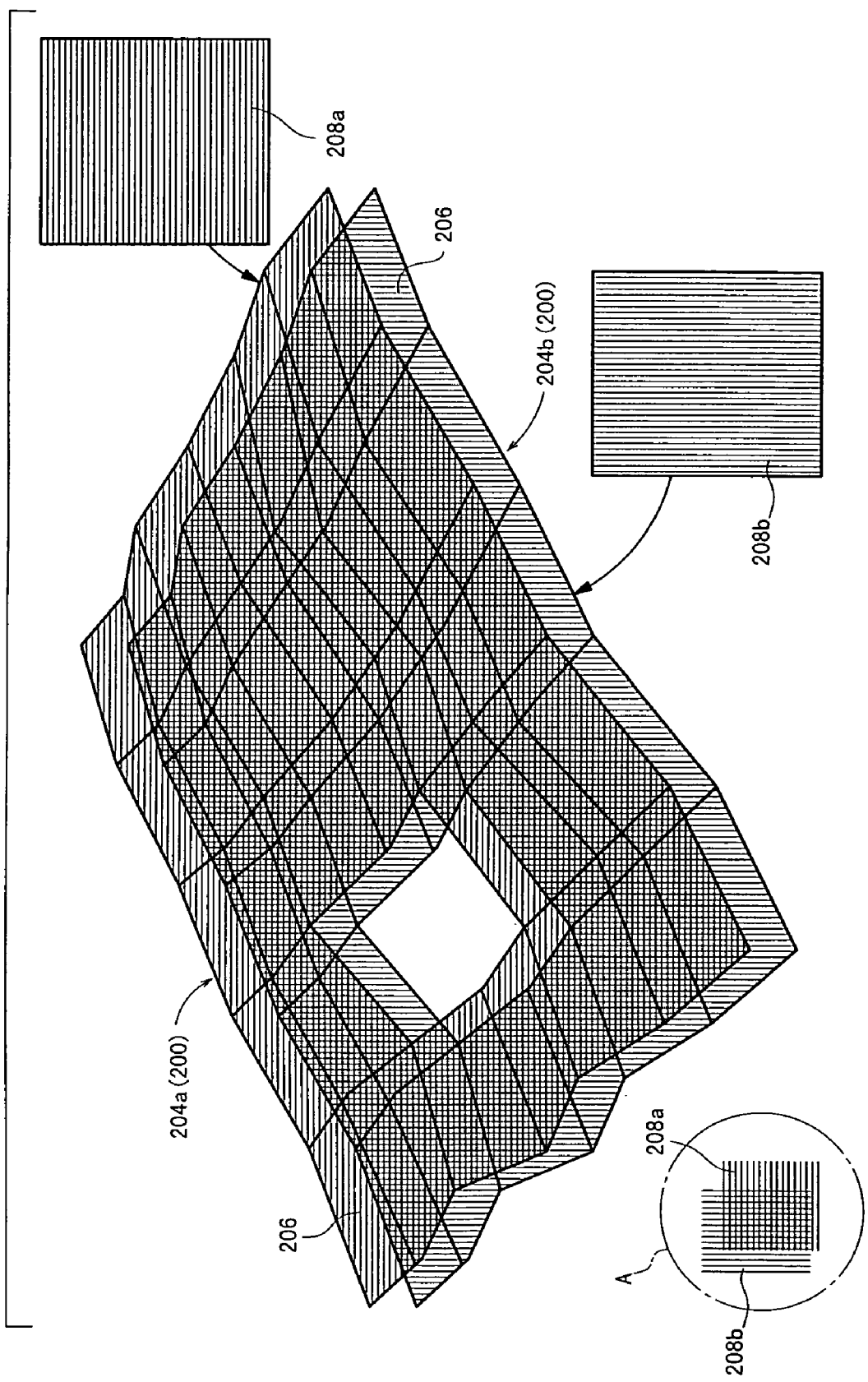
FIG. 6 is a view showing objects that are arranged in superposed layers.

For example, as shown in FIG. 6, two objects, i.e., first and second objects, 204a, 204b are prepared for the river 200 with the post 202 standing therein. Each of the first and second objects 204a, 204b is made up of a number of polygons 206. A first texture image 208a is mapped onto each of the polygons 206 of the first object 204a, and a second texture image 208b is mapped onto each of the polygons 206 of the second object 204b.

When the first and second objects 204a, 204b are arranged in superposed layers, the first texture image 208a and the second texture image 208b are superposed, producing various patterns, as shown in an encircled area A in FIG. 6.

The first and second texture images 208a, 208b are moved on the first and second objects 204a, 204b with time in an arbitrary direction and restored in the texture rendering area 34a. Therefore, an infinite number of random patterns are generated or animated on the first and second objects 204a, 204b superposed in layers, making it possible to express a fluid motion such as a stream of water or a flow of smoke in a realistic manner.

Figure 7B:
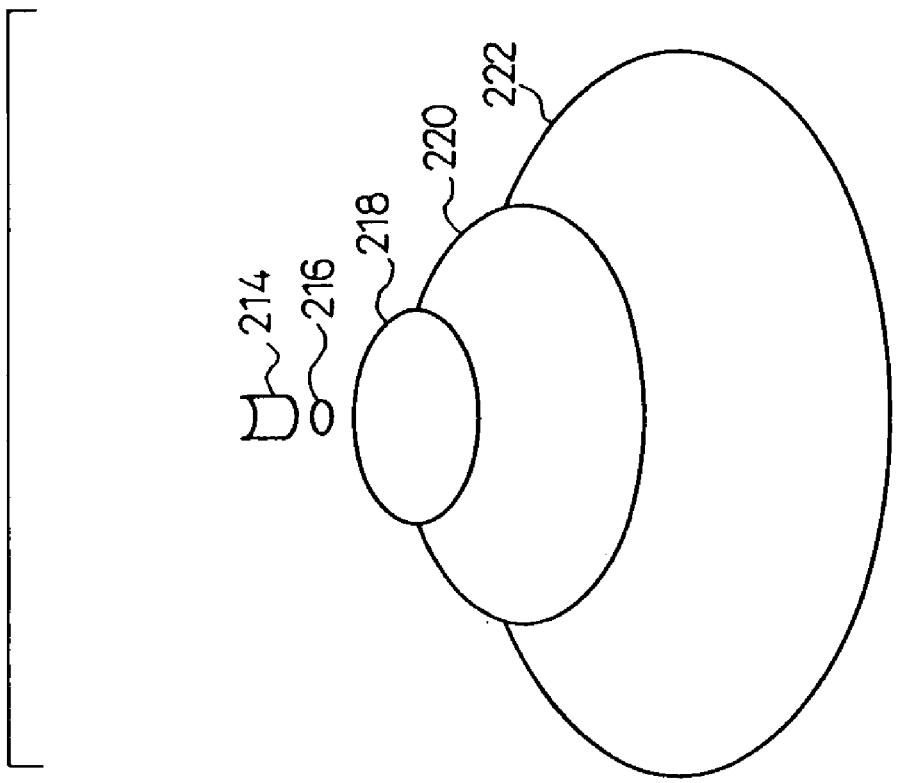
FIG. 7B is a view showing the image illustrated in FIG. 7A as it is separated into a plurality of objects.
Figure 7A:
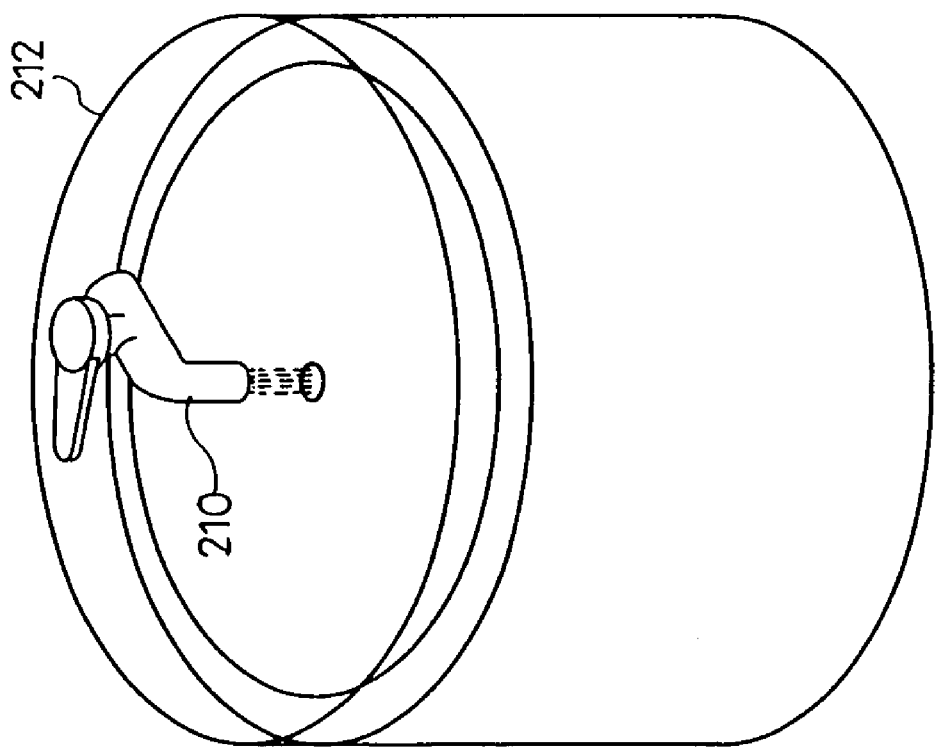
FIG. 7A is a view showing the manner in which water pouring from a faucet is stored in a transparent water tank.

As shown in FIG. 7A, one example of a number of objects arranged in superposed layers is a scene in which water pouring from a faucet 210 is stored in a transparent water tank 212. In this example, as shown in FIG. 7B, an object 214 represents the manner in which water flows out from the faucet 210, two objects 216, 218 represent the manner in which water from the faucet 210 spreads out on the water surface in the water tank 212, and two objects 220, 222 represent the manner in which water is stored in the water tank 212. These objects 214, 216, 218, 220, 222 are arranged in superposed layers.

Each of the objects 214, 216, 218, 220, 222 is constructed of a number of polygons. Individual texture images 208 stored in the texture rendering area 34a are mapped onto the respective polygons, and moved on the objects 214, 216, 218, 220, 222 with time in an arbitrary direction and restored in the texture rendering area 34a. As a result, it is possible to display a realistic image of water pouring from the faucet 210 and stored in the transparent water tank 212.

An example of software, i.e., a rendering means 300 (see FIG. 8), to perform the above function will be described below with reference to FIGS. 8 through 18.

The rendering means 300 is supplied to the entertainment apparatus 10 from a randomly accessible recording medium such as a CD-ROM or a memory card or via a network. It is assumed here that the rendering means 300 is read into the entertainment apparatus 10 from an optical disk 42 such as a CD-ROM.

The rendering means 300 is downloaded in advance from the optical disk 42 played back by the entertainment apparatus 10 into the main memory 14 of the entertainment apparatus 10 according to a predetermined process, and executed by the main CPU 12.

As shown in FIG. 8, the rendering means 300 comprises a table reading means 302 for reading various tables including an object information table 322, a plurality of texture information tables 304, a plurality of polygon information tables 308, and a plurality of movement information tables 312 which are recorded in the optical disk 42, a texture rendering means 306 for rendering and storing necessary texture images 208 in the texture rendering area 34a of the image memory 34 based on the content of one of the texture information tables 304, an image rendering means 310 for rendering and storing polygons 206 in the display rendering area 34b of the image memory 34 based on the texture images 208 stored in the texture rendering area 34a and the content of one of the polygon information tables 308, and mapping necessary texture images 208 onto the polygons 206, a texture moving means 314 for moving the texture images 208 stored in the texture rendering area 34a based on the content of one of the movement information tables 312 and restoring the moved texture images 208 in the texture rendering area 34a, a texture mapping means 316 for mapping moved texture images 208 onto the polygons 206 stored in the display rendering area 34b, an end determining means 318 for determining whether the processing sequence of the rendering means 300 is completed or not, and a display processing means 320 for outputting image data stored in the display rendering area 34b to the display monitor 16 and displaying an image on the display monitor 16 based on the image data.

The various tables used by the rendering means will be described below with reference to FIGS. 9 through 12.

As shown in FIG. 9, the object information table 322 stores a plurality of records which correspond to respective objects, each containing the number of polygons 206 making up an object 204, the address of a corresponding texture information table 304, the address of a corresponding polygon information table 308, and the address of a corresponding movement information table 312.

Figure 10:
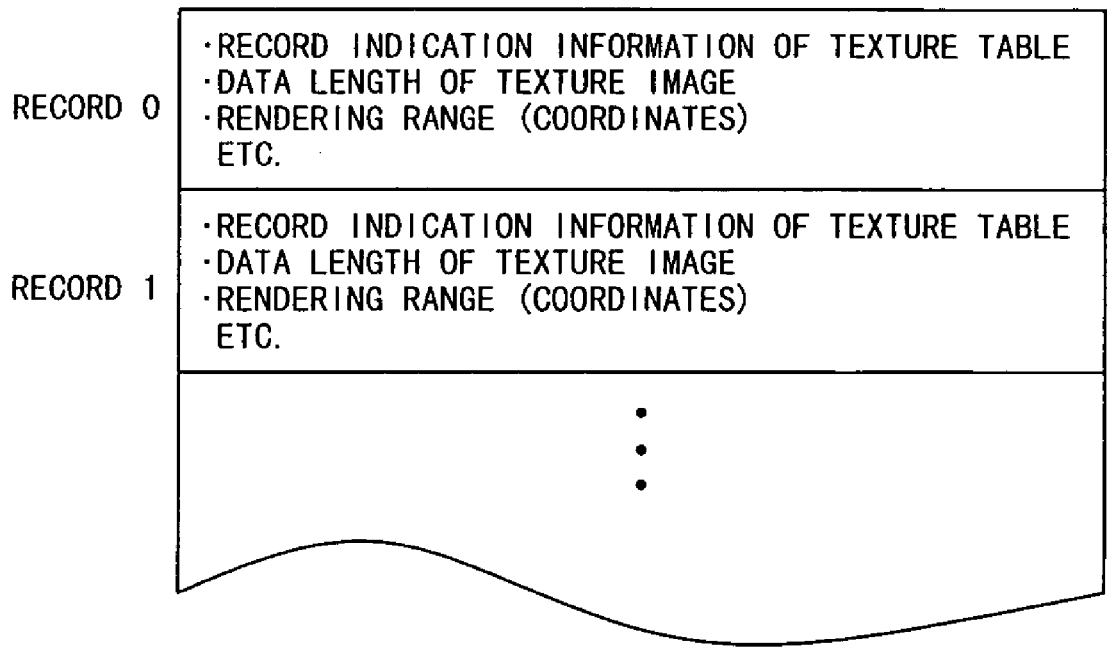
FIG. 10 is a diagram showing details of a texture information table.

As shown in FIG. 10, the texture information table 304 stores a plurality of records which correspond to respective textures, each containing corresponding record indication information in a corresponding texture table, which stores leading addresses of stored texture image data in respective records, data length of a texture image to be used, and a rendering range (coordinates) for storing the texture image in the texture rendering area 34a.

As shown in FIG. 11, the polygon information table 308 stores a plurality of records which correspond to respective polygons, each containing the vertex coordinates of a polygon 206, and the rendering range (coordinates) for storing the texture image 208 to be used in the texture rendering area 34a.

As shown in FIG. 12, the movement information table 312 stores a plurality of records which correspond to respective texture images 208 to be moved, each containing a range (coordinates) for storing a texture image 208 to be moved in the texture rendering area 34a, direction information as to the direction (up, down, left, or right) in which to move the texture image 208, and circulation information as to whether the texture image 208 is to be circulated or not.

The processing sequence of the rendering means 300 will be described below with reference to FIGS. 13 through 18.

Figure 13:
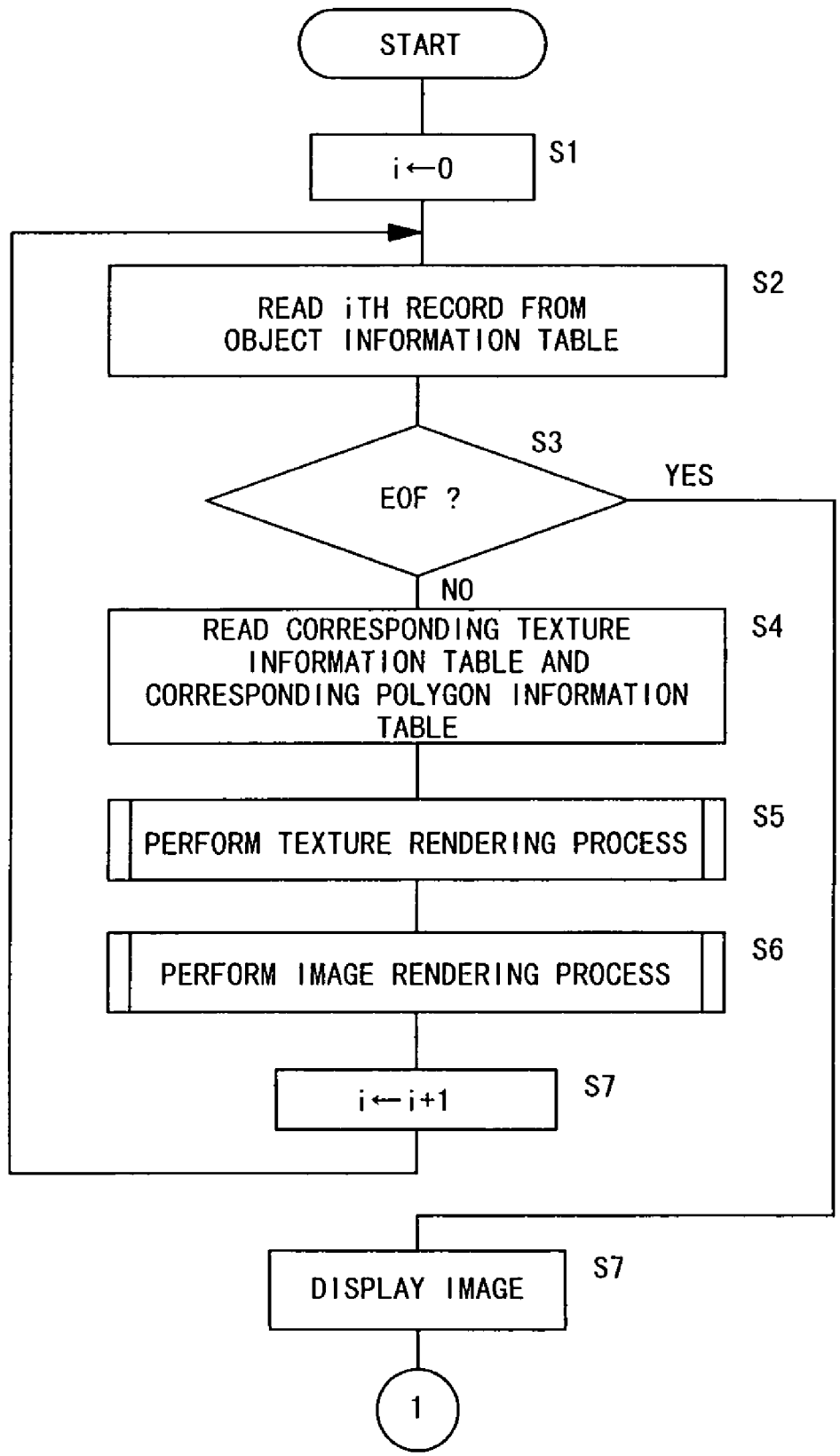
FIGS. 13 and 14 are a flowchart of a processing sequence of the rendering means.

In step S1 shown in FIG. 13, the rendering means 300 stores an initial value "0" into an index register i used to retrieve objects 204, thereby initializing the index register i.

In step S2, the table reading means 302 reads an ith record from the object information table 322.

In step S3, the end determining means 318 decides whether the content of the read ith record is an EOF (End-Of-File) code indicative of the end of the object information table 322 or not.

If the content of the read ith record is not an EOF code, then control goes to step S4 in which the table reading means 302 reads the address of the corresponding texture information table 304 and the address of the corresponding polygon information table 308 from the ith record in the object information table 322, and reads the corresponding texture information table 304 and the corresponding polygon information table 308.

Figure 15:
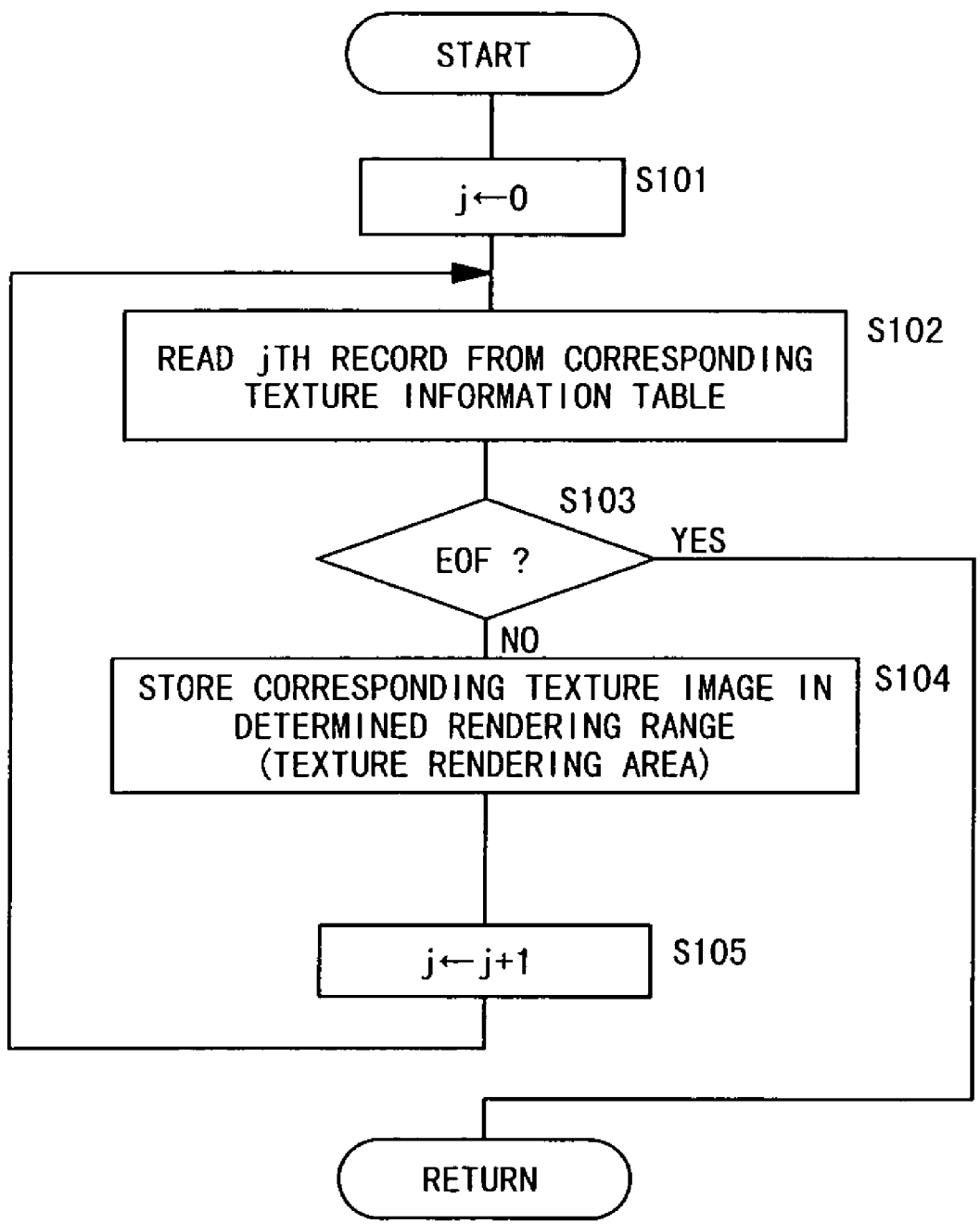
FIG. 15 is a flowchart of a processing sequence of a texture rendering means.

In step S5, the texture rendering means 306 performs its own processing sequence, which is illustrated in FIG. 15. In step S101 shown in FIG. 15, the texture rendering means 306 stores an initial value "0" into an index register j used to retrieve texture images 208, thereby initializing the index register j.

In step S102, the texture rendering means 306 reads a jth record from the corresponding texture information table 304.

In step S103, the texture rendering means 306 decides whether the content of the read jth record is an EOF code indicative of the end of the texture information table 304 or not.

If the content of the read jth record is not an EOF code, then control goes to step S104 in which the texture rendering means 306 reads texture image data based on the record indication information in the texture table and the data length of a texture image 208 stored in the jth record, and stores the texture image data in the portion of the texture rendering area 34a which corresponds to the rendering range that is stored in the jth record.

In step S105, the texture rendering means 306 increments the value of the index register j by "1". Then, control goes back to step S102 to repeat the above process based on the content of a next record in the texture information table 304.

If the content of the read jth record is an EOF code indicative of the end of the texture information table 304, then the processing sequence of the texture rendering means 306 is ended.

Figure 16:
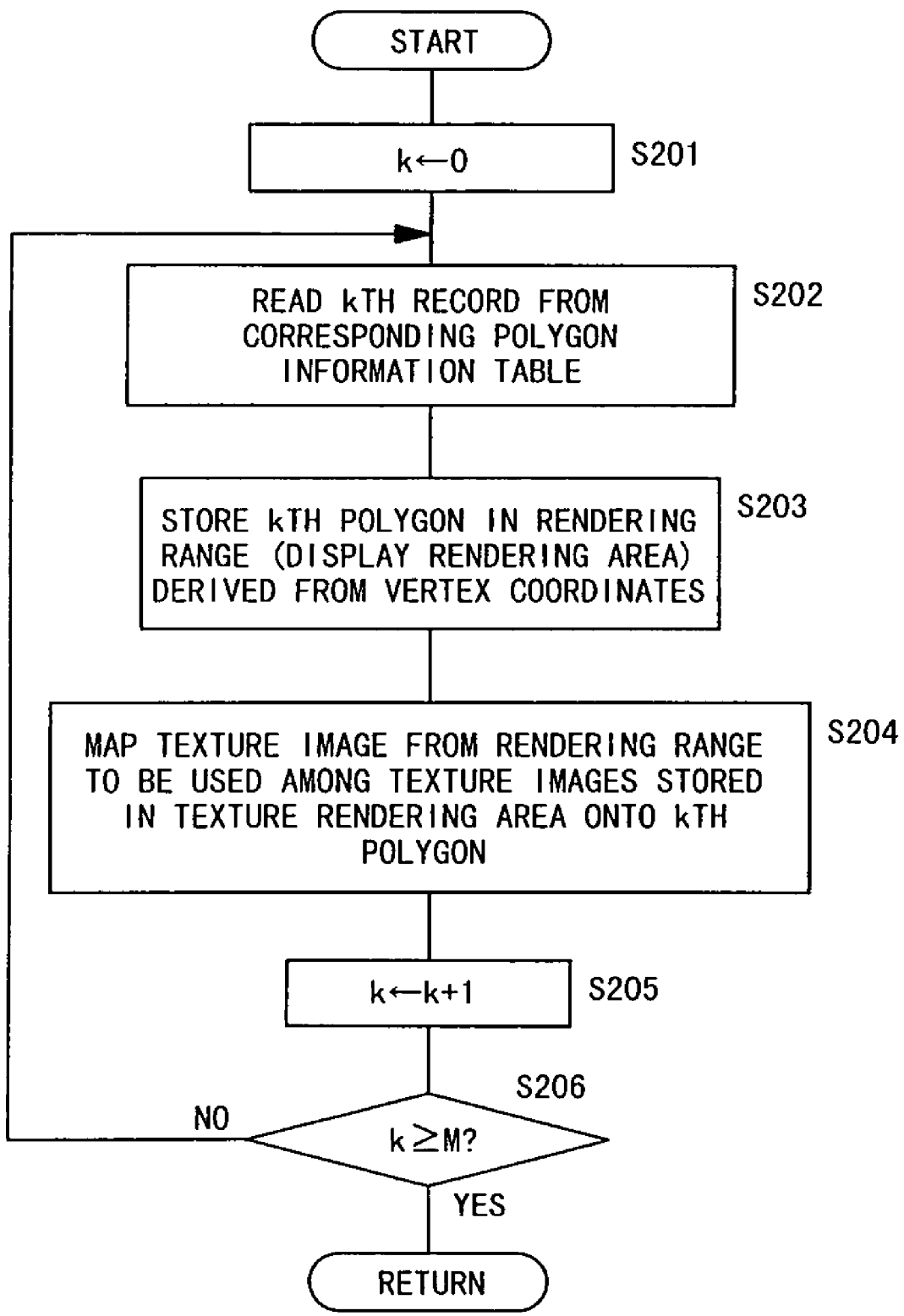
FIG. 16 is a flowchart of a processing sequence of a rendering means.

Control returns to the main routine shown in FIG. 13. In step S6, the image rendering means 310 performs its own processing sequence, which is illustrated in FIG. 16. In step S201 shown in FIG. 16, the image rendering means 310 stores an initial value "0" into an index register k used to retrieve polygons 206, thereby initializing the index register k.

In step S202, the image rendering means 310 reads a kth record from the corresponding polygon information table 308.

In step S203, the image rendering means 310 stores a kth polygon 206 into the portion of the display rendering area 34b which corresponds to the rendering range derived from the vertex coordinates.

In step S204, the image rendering means 310 reads a texture image 208 from the rendering range for the texture image 208 to be used, among the texture images 208 stored in the texture rendering area 34a, and maps the read texture image 208 onto the kth polygon 206.

In step S205, the image rendering means 310 increments the value of the index register k by "1". Thereafter, in step S206, the image rendering means 310 decides whether all the polygons 206 have been processed or not, based on whether or not the value of the index register k is equal to or greater than the number M of polygons.

If not all the polygons 206 have been processed, then control returns to step S202 for rendering a next polygon 206 and mapping a necessary texture image 208 onto the next polygon 206.

If all the polygons 206 have been processed in step S206, then the processing sequence of the image rendering means 310 comes to an end.

Control returns to the main routine shown in FIG. 13. In step S7, the rendering means 300 increments the value of the index register i by '1'. Then, control goes back to step S2 for repeating the above process with respect to a next object 204.

If the content of the read ith record is an EOF code indicating the end of the object information table 322 in step S3, then control jumps to step S8 in which the display processing means 320 outputs the image data stored in the display rendering area 34b to the display monitor 16, which displays an image based on the supplied image data.

Figure 14:
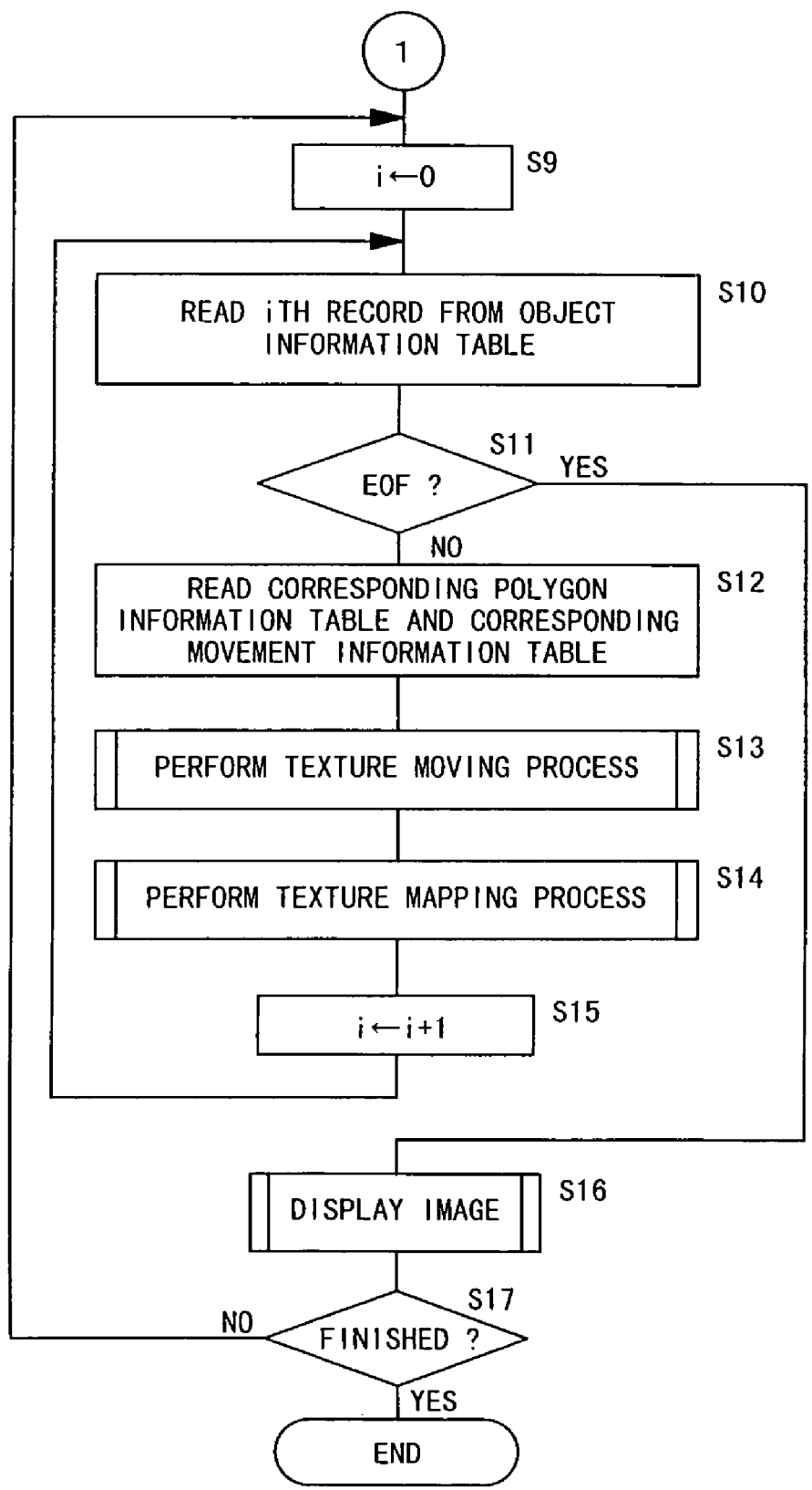

In step S9 shown in FIG. 14, the rendering means 300 stores an initial value "0" into the index register i used to retrieve objects 204, thereby initializing the index register i.

In step S10, the table reading means 302 reads an ith record from the object information table 322.

In step S11, the end determining means 318 decides whether the content of the read ith record is an EOF code indicative of the end of the object information table 322 or not.

If the content of the read ith record is not an EOF code, then control goes to step S12 in which the table reading means 302 reads the address of the corresponding polygon information table 308 and the address of the corresponding movement information table 312 from the ith record in the object information table 322, and reads the corresponding polygon information table 308 and the corresponding movement information table 312.

Figure 17:
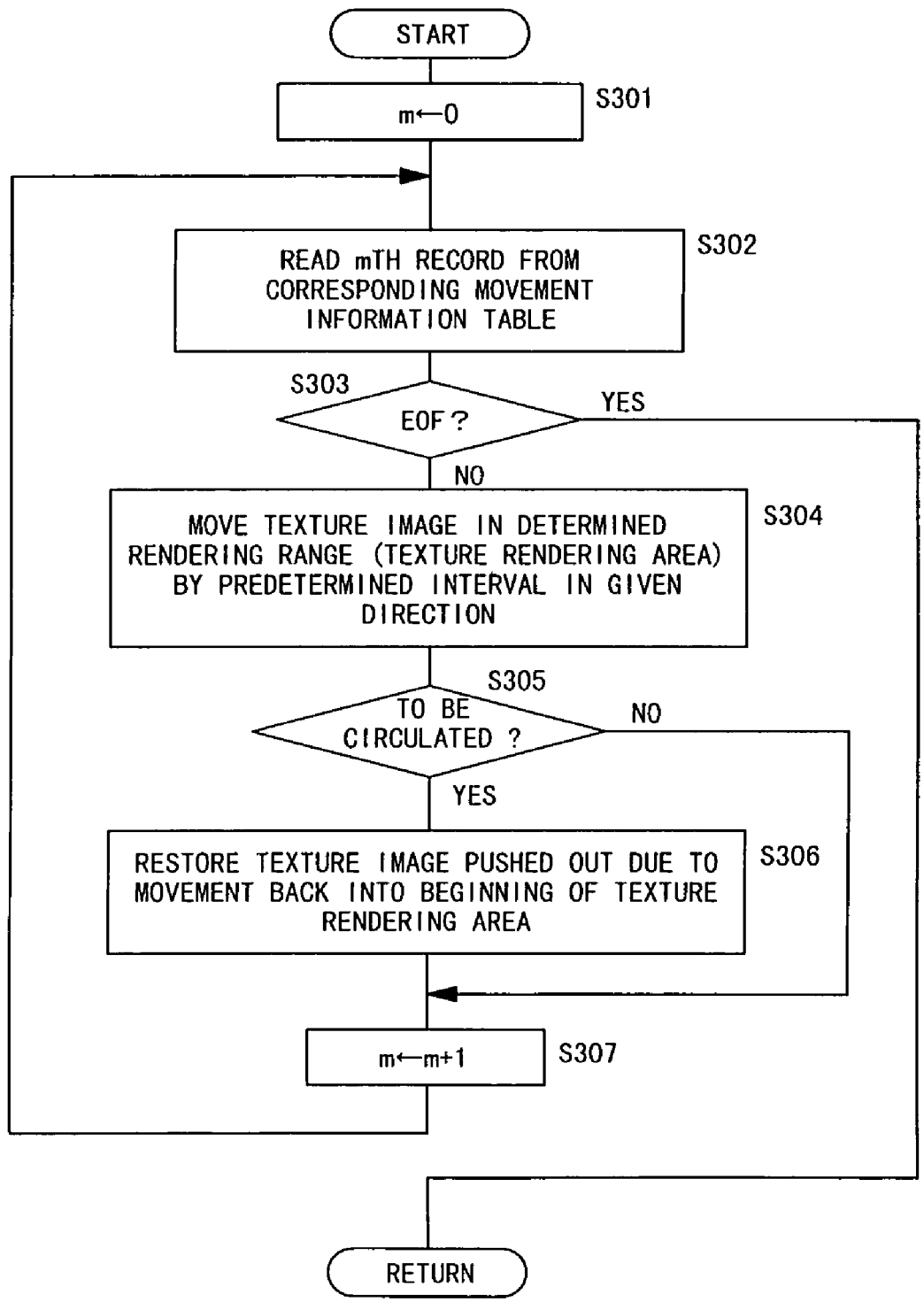
FIG. 17 is a flowchart of a processing sequence of a texture moving means.

In step S13, the texture moving means 314 performs its own processing sequence, which is illustrated in FIG. 17. In step S301 shown in FIG. 17, the texture moving means 314 stores an initial value "0" into an index register m used to retrieve movement information, thereby initializing the index register m.

In step S302, the texture moving means 314 reads an mth record from the movement information table 312.

In step S303, the texture moving means 314 decides whether the content of the read mth record is an EOF code indicative of the end of the movement information table 312 or not.

If the content of the read mth record is not an EOF code, then control goes to step S304 in which the texture moving means 314 moves a texture image 208 to be moved which corresponds to the rendering range for the texture image 208 stored in the mth record, among the texture images 208 stored in the texture rendering area 34a, by a predetermined interval in the direction information stored in the mth record, and restores the moved texture image 208 in the texture rendering area 34a.

In step S305, the texture moving means 314 decides whether the texture image 208 needs to be circulated or not, based on the circulation information stored in the mth record.

If the texture image 208 needs to be circulated, then control goes to step S306 in which the texture moving means 314 restores any texture image 208 pushed out or erased from the end of the texture rendering area 34a due to the movement carried out in step S304, back in the beginning of the texture rendering area 34a.

After the processing in step S306 or if the texture image 208 does not need to be circulated in step S305, then control goes to step S307 in which the texture moving means 314 increments the value of the index register m by '1'. Thereafter, control goes back to step S302 for moving and restoring the corresponding texture image 208 based on next movement information.

If the content of the read mth record is an EOF code indicative of the end of the movement information table 312 in step S303, then the processing sequence of the texture moving means 314 is ended.

Control returns to the main routine shown in FIG. 14. In step S14, the texture mapping means 316 performs its own processing sequence, which is illustrated in FIG. 18.

In step S401 shown in FIG. 18, the texture mapping means 316 stores an initial value "0" into the index register k used to retrieve polygons 206, thereby initializing the index register k.

In step S402, the texture mapping means 316 reads a kth record from the corresponding polygon information table 308.

In step S403, the texture mapping means 316 reads a texture image 208 from the rendering range for the texture image 208 to be used, among the texture images 208 stored in the texture rendering area 34a, and maps the read texture image 208 onto the kth polygon 206.

In step S404, the texture mapping means 316 increments the value of the index register k by "1". Thereafter, in step S405, the texture mapping means 316 decides whether all the polygons 206 have been processed or not, based on whether or not the value of the index register k is equal to or greater than the number M of polygons.

If not all the polygons 206 have been processed, then control returns to step S402 for rendering a next polygon 206 and mapping a necessary texture image 208 onto the next polygon 206.

If all the polygons 206 have been processed in step S405, then the processing sequence of the texture mapping means 316 comes to an end.

Control returns to the main routine shown in FIG. 14. In step S15, the rendering means 300 increments the value of the index register i by "1". Then, control goes back to step S10 for repeating the above process, i.e., the process of moving the texture image 208 and mapping the texture image 208 onto the polygon 206, with respect to a next object 204.

If the content of the read ith record is an EOF code indicating the end of the object information table 322 in step S11, then control jumps to step S16 in which the display processing means 320 outputs the image data stored in the display rendering area 34b to the display monitor 16, which displays an image based on the supplied image data.

In step S17, the end determining means 318 decides whether there is a program end request to finish the processing sequence of the rendering means 300 or not. If there is no program end request, then control goes back to step S9 for performing the above process, i.e., the process of moving the texture image 208 and mapping the texture image 208 onto the polygon 206, from the first object 204.

If there is a program end request in step S17, then the processing sequence of the rendering means 300 is finished.

As described above, the rendering means 300 according to the present invention renders an image by moving a texture image 208 simulatively on at least one object 204. Specifically, one or more semitransparent texture images 208 are placed on the surface of one or more semitransparent or transparent objects 204, and moved simulatively in an arbitrary direction, thereby rendering an image.

The texture images 208 that are moved simulatively on the surface of the objects 204 are superposed on the objects 204, thereby generating or animating an infinite number of random patterns to express a fluid motion such as a stream of water or a flow of smoke.

Since the rendering means 300 renders an image by moving a texture image 208 simulatively on at least one object 204, the period of time required to calculate and render a fluid motion can greatly be reduced, and a high-quality image can be rendered.

Although a certain preferred embodiment of the present invention has been shown and described in detail, it should be understood that various changes and modifications may be made therein without departing from the scope of the appended claims.

What is claimed is:

1. A method of rendering an image, comprising the steps of:

mapping first semitransparent texture images respectively onto first polygons which make up a first semitransparent object having at least one three-dimensional shape, the first semitransparent texture images being written into a texture rendering area of an image memory and corresponding to the first semitransparent object;

mapping second semitransparent texture images respectively onto second polygons which make up a second semitransparent object having at least one three-dimensional shape, the second semitransparent texture images being written into the texture rendering area and corresponding to the second semitransparent object, and the second semitransparent object being rendered to lap over the first semitransparent object;

arbitrarily moving the first and second semitransparent texture images to rewrite them into the texture rendering area, thereby causing said first semitransparent texture images to be associated respectively with different polygons from among said first polygons, and causing said second semitransparent texture images to be associated respectively with different polygons from among said second polygons; and repeating the mapping step of the first semitransparent texture images, the mapping step of the second semitransparent texture images and the arbitrary moving step of the first and second semitransparent texture images, wherein, during said arbitrary moving step, said first semitransparent texture images are associated respectively with different adjacent polygons from among said first polygons in a circulating manner, and said second semitransparent texture images are associated respectively with different adjacent polygons from among said second polygons in a circulating manner.

2. A method of processing an image, comprising the steps of:

sequentially rendering at least three semitransparent objects each having a three-dimensional shape, wherein the sequential rendering is performed by selecting one of the semitransparent objects, mapping semitransparent texture images corresponding to the selected semitransparent object onto polygons which make up the selected object, the semitransparent texture images being written into a texture rendering area of an image memory;

sequentially moving the semitransparent texture images of each of the at least three semitransparent objects, wherein the sequential moving step is performed by selecting one of the rendered semitransparent objects and arbitrarily moving the semitransparent texture images to rewrite them into the texture rendering area, thereby causing said semitransparent texture images to be associated respectively with different polygons from among said polygons which make up the selected object; and repeating the sequential rendering step and the sequential moving step, wherein, during said sequential moving step, said semitransparent texture images are associated respectively with different adjacent polygons from among said polygons in a circulating manner.

3. A method according to claim 2, wherein the sequential rendering step comprises sequentially rendering the semitransparent objects to lap over the rendered semitransparent objects.

4. An apparatus for rendering an object in an image memory, comprising:

first semitransparent object rendering means for mapping first semitransparent texture images respectively onto first polygons which make up a first semitransparent object having at least one three-dimensional shape, the first semitransparent texture images being written into a texture rendering area of an image memory and corresponding to the first semitransparent object;

second semitransparent object rendering means for mapping second semitransparent texture images respectively onto second polygons which make up a second semitransparent object having at least one three-dimensional shape, the second semitransparent texture images being written into the texture rendering area and corresponding to the second semitransparent object, and the second semitransparent object being rendered to lap over the first semitransparent object; and texture moving means for arbitrarily moving the first and second semitransparent texture images to rewrite them into the texture rendering area, thereby causing said first semitransparent texture images to be associated respectively with different polygons from among said first polygons and causing said second semitransparent texture images to be associated respectively with different polygons from among said second polygons, wherein operations of the first semitransparent object rendering means, the second semitransparent object rendering means and the texture moving means are repeated.

5. An apparatus according to claim 4, wherein said texture moving means moves said first semitransparent texture images so as to become associated respectively with different adjacent polygons from among said first polygons in a circulating manner, and moves said second semitransparent texture images so as to become associated respectively with different adjacent polygons from among said second polygons in a circulating manner.

6. A computer-readable recording medium storing a program, the program operating an image rendering apparatus for rendering an object in an image memory, the program comprising:

first semitransparent object rendering means for mapping first semitransparent texture images respectively onto first polygons which make up a first semitransparent object having at least one three-dimensional shape, the first semitransparent texture images being written into a texture rendering area of an image memory and corresponding to the first semitransparent object;

second semitransparent object rendering means for mapping second semitransparent texture images respectively onto second polygons which make up a second semitransparent object having at least one three-dimensional shape, the second semitransparent texture images being written into the texture rendering area and corresponding to the second semitransparent object, and the second semitransparent object being rendered to lap over the first semitransparent object;

texture moving means for arbitrarily moving the first and second semitransparent texture images to rewrite them into the texture rendering area, thereby causing said first semitransparent texture images to be associated respectively with different polygons from among said first polygons and causing said second semitransparent texture images to be associated respectively with different polygons from among said second polygons; and repeating means for repeating operations of the first semitransparent object rendering means, the second semitransparent object rendering means and the texture moving means.

7. A computer-readable recording medium according to claim 6, wherein said texture moving means moves said first semitransparent texture images so as to become associated respectively with different adjacent polygons from among said first polygons in a circulating manner, and moves said second semitransparent texture images so as to become associated respectively with different adjacent polygons from among said second polygons in a circulating manner.

8. A computer-readable recording medium storing a program, the program operating an image rendering apparatus for rendering an object in an image memory, the program comprising:

semitransparent object rendering means for sequentially rendering at least three semitransparent objects each having a three-dimensional shape, wherein the sequential rendering is performed by selecting one of the semitransparent objects, mapping semitransparent texture images corresponding to the selected semitransparent object onto polygons which make up the selected object, the semitransparent texture images being written into a texture rendering area of an image memory;

texture image moving means for sequentially moving the semitransparent texture images of each of the at least three semitransparent objects, wherein the sequential moving is performed by selecting one of the rendered semitransparent objects and arbitrarily moving the semitransparent texture images to rewrite them into the texture rendering area, thereby causing said semitransparent texture images to be associated respectively with different polygons from among said polygons which make up the selected object; and repeating means for repeating operations of the semitransparent object rendering means and the texture image moving means.

9. A computer-readable recording medium according to claim 8, wherein the semitransparent object rendering means sequentially renders the semitransparent objects to lap over the rendered semitransparent objects.

10. A computer-readable recording medium according to claim 8, wherein said texture image moving means sequentially moves said semitransparent texture images so as to be associated respectively with different adjacent polygons from among said polygons in a circulating manner.

* * * * *